US012625157B2

(12) United States Patent
Jahn et al.

(10) Patent No.: US 12,625,157 B2
(45) Date of Patent: May 12, 2026

(54) ANEMOMETER WITH PIVOTING MOUNT AND INTEGRATED BEACON

(71) Applicant: Fernsteuergeräte Kurt Oelsch GmbH, Berlin (DE)

(72) Inventors: Volker Jahn, Heidesee (DE); Pawel Knitter, Berlin (DE)

(73) Assignee: Fernsteuergeräte Kurt Oelsch GmbH, Berlin (DE)

( * ) Notice: Subject to any disclaimer, the term of this patent is extended or adjusted under 35 U.S.C. 154(b) by 251 days.

(21) Appl. No.: 18/281,813

(22) PCT Filed: Mar. 8, 2022

(86) PCT No.: PCT/DE2022/100185
§ 371 (c)(1),
(2) Date: Sep. 13, 2023

(87) PCT Pub. No.: WO2022/218461
PCT Pub. Date: Oct. 20, 2022

(65) Prior Publication Data
US 2024/0151740 A1      May 9, 2024

(30) Foreign Application Priority Data

Apr. 12, 2021    (DE) .................... 20 2021 101 938.7

(51) Int. Cl.
*G01P 5/06*          (2006.01)
*B64F 1/20*          (2006.01)
(52) U.S. Cl.
CPC . *G01P 5/06* (2013.01); *B64F 1/20* (2013.01)

(58) Field of Classification Search
CPC .... G01P 5/12; G01P 13/02; G01P 5/26; G01P 5/06; G01P 5/02; G01P 5/07; G01P 5/10; G01P 21/025; G01P 5/00; G01P 5/245; G01P 5/14; G01P 1/00; G01P 13/045; G01P 5/241; G01P 1/026; G01P 5/18; G01P 5/08; G01P 5/065; G01P 5/24; G01P 5/248; G01P 13/025; G01P 5/04; G01P 5/165; G01P 5/16; G01P 21/00; G01P 5/001;
(Continued)

(56) References Cited

U.S. PATENT DOCUMENTS

| | | | | | |
|---|---|---|---|---|---|
| 3,541,855 | A | * | 11/1970 | Frenzen | .................... G01P 5/07 73/861.85 |
| 6,993,965 | B2 | * | 2/2006 | Yoshida | .................. F03D 17/00 73/170.01 |

(Continued)

FOREIGN PATENT DOCUMENTS

| | | | | | |
|---|---|---|---|---|---|
| CN | 204903567 | U | * | 12/2015 | |
| CN | 107247158 | A | * | 10/2017 | ............ G01P 13/025 |

(Continued)

*Primary Examiner* — Andre J Allen
(74) *Attorney, Agent, or Firm* — Smartpat PLC

(57) ABSTRACT

An anemometer (10) for measuring wind speeds includes a housing (16) and/or frame. A shaft (20) is mounted such that it can rotate in a bearing of the housing (16) and/or frame. Wind capturing means (14) are arranged on the shaft (20), said wind capturing means (14) setting the shaft (20) to rotate in the wind. Detecting means (43) detect the rotational speed (ω) of the shaft (20). Issuing means (49) are also provided for issuing the detected rotational speed (ω).

15 Claims, 3 Drawing Sheets

(58) Field of Classification Search
CPC .......... G01P 5/01; G01P 15/093; G01P 13/04; G01P 13/00; G01P 3/44; G01P 1/006; G01P 21/02; G01P 5/006; G01P 5/005; G01P 5/20; G01P 5/242; G01P 1/103; G01P 3/50; G01P 1/08; G01P 13/0033; G01P 1/02; G01P 1/04; G01P 3/4802; G01P 3/486; G01P 13/004; G01P 13/006; G01P 3/443; G01P 3/481; G01P 3/489; G01P 5/244; G01P 13/0026; G01P 13/0073; G01P 3/46; G01P 3/484; G01P 3/68; G01P 1/06; G01P 1/07; G01P 1/127; G01P 13/002; G01P 13/0053; G01P 13/0066; G01P 3/04; G01P 5/008; G01P 5/083; G01P 5/086; G01P 5/17; G01P 1/003; G01P 1/10; G01P 1/122; G01P 13/0006; G01P 13/0046; G01P 13/008; G01P 15/0802; G01P 2015/0808; G01P 3/14; G01P 3/36; G01P 3/465; G01P 3/483; G01P 3/487; G01P 3/60; G01P 7/00; G01P 1/14; G01P 11/00; G01P 15/16; G01P 3/42; G01P 3/56; G01P 3/64; G01P 3/806

USPC ....................................................... 73/170.07
See application file for complete search history.

(56) References Cited

U.S. PATENT DOCUMENTS

| | | | | |
|---|---|---|---|---|
| 8,443,682 | B2 * | 5/2013 | Hong ........................ | G01P 5/06 |
| | | | | 73/861.85 |
| 10,620,231 | B2 * | 4/2020 | Peters .................... | G01P 5/245 |

FOREIGN PATENT DOCUMENTS

| | | | | | |
|---|---|---|---|---|---|
| CN | 211651917 | U | 10/2020 | | |
| DE | 1953510 | U | 9/1970 | | |
| DE | 3605462 | A1 | 8/1987 | | |
| DE | 202006017695 | U1 | 3/2007 | | |
| DE | 102009044201 | A1 * | 4/2011 | ........... | G01P 21/025 |
| DE | 102014000652 | A1 | 7/2015 | | |
| DE | 202013012247 | U1 | 10/2015 | | |
| EP | 1482312 | A1 * | 12/2004 | ............... | G01P 5/07 |
| GB | 1012399 | A | 12/1965 | | |
| KR | 101349086 | B1 * | 1/2014 | ........... | G09F 13/30 |

* cited by examiner

ANEMOMETER WITH PIVOTING MOUNT AND INTEGRATED BEACON

CROSS-REFERENCE TO RELATED APPLICATION

This application is a national stage application, filed under 35 U.S.C. § 371, of International Patent Application PCT/DE2022/100185, filed on Mar. 8, 2022, which claims the benefit of German Patent Application DE 20 2021 101 938.7, filed on Apr. 12, 2021.

BACKGROUND

Anemometers are devices for measuring wind speed. One of the most common types of anemometer is the so-called cup anemometer. In the cup anemometer, wind speed is measured using a wind rotor mounted on a shaft, wherein the wind rotor has a horizontal plane of rotation and a vertically oriented rotation axis. This wind rotor, typically consisting of at least two, but often three or four hemisphere-like cups, is driven by the wind. These hemisphere-like cups are arranged in a star-like pattern around a shaft.

The shaft is rotatably mounted within a housing or frame. The wind interacts with the hemisphere-like cups and thus drives the shaft around its axis of rotation. The wind speed can be determined through the rotation speed of the shaft. The cup anemometer is a preferred measurement system due to its simple construction, relative maintenance-free nature, and robust mechanical design. Additionally, the system operates without requiring wind direction guidance. Furthermore, complex measurement techniques are not necessary, as a signal is directly generated either through optical or electromagnetic impulses.

Cup anemometers are known, which have a mechanically functioning display, whose number of revolutions is represented by a clockwork mechanism. Only the wind strength causes the speed of the cup anemometer's rotation, which can be determined through the latter.

For electromagnetic pulse generation, for example, a voltage generator is coupled with the shaft. The voltage generator produces an electric voltage proportional to the rotation speed, which can be converted into wind speed and then displayed using analog or digital evaluation and display means.

A similar principle is employed by the so-called wind vane anemometer. The wind sets an impeller in motion, which rotates around a horizontal axis. The rotation speed of the impeller represents the wind speed. At very low wind speeds, the measurement can be somewhat imprecise due to the necessary overcoming of the starting resistance, which is still present even with relatively low frictional resistance in the pivot bearing of the wind vane. Modern wind vane anemometers are typically compact handheld devices designed for mobile operation. Larger, stationary wind vane assemblies with a weather vane for alignment with the wind direction are used at some weather stations. Otherwise, they are stationary and used for measuring relatively weak flows for research purposes in wind tunnels.

Furthermore, ultrasonic anemometers are often used. Ultrasonic anemometers operate based on the principles of time-of-flight measurement or acoustic resonance. In time-of-flight measurement, it takes advantage of the fact that ultrasonic waves are carried by the medium in which they propagate, so the time of flight of signals over a fixed-length path depends on the flow through the measurement path. In acoustic resonance, multiple oscillating membranes are present within a cavity, which generate and receive acoustic ultrasonic waves. Through repeated reflection between reflectors, a quasi-standing wave perpendicular to the wind direction and a transverse wave parallel to the wind direction are generated. When air flows along the axis between the reflectors, it influences the wave propagation speed and creates a phase shift, from which the wind speed can be calculated.

Beacons are also known to signal the position of mobile or stationary objects. Beacons are mostly electrically powered light sources that generate pulsating or continuously radiating light signals. These light signals are often of different colors and also have varying meanings. They are used particularly for determining the position of an object or drawing attention to an object at a specific location. Such beacons are often employed on tall buildings, chimneys, antennas, construction machinery, cranes, or power plants, such as wind turbines. They signal to airplanes or helicopters, for example, that a tall object is located there. In maritime navigation, beacons, especially for position determination, are well-known. In road traffic, beacons are used for heavy transport operations.

DE 36 05 462 A1 describes a method for ensuring safe operation of self-propelled boom cranes by forming stability signals from the sensors of the supports and axes, and strength signals from the sensors of the crane components. Strength sensors can also be installed in the supports and axes. The sensors can also be designed as inclinometers to limit the crane inclination, as anemometers to limit wind influence on the crane, and the like.

From DE 10 2014 000 652 A1, it is known that a wind turbine and a crane are arranged on the same platform. A wind vane, combined with an anemometer, is disclosed there. The anemometer serves to determine wind speed.

DE 20 2006 017 695 U1 discloses a device for measuring wind speed. The measurement is preferably performed during a production interruption of a wind turbine. The wind turbine is connected to a boom with wind measuring devices, which can rotate depending on the wind direction. Conventional measuring devices are used, especially mechanical cup anemometers along with wind direction indicators, or anemometers with acoustic detection.

DE 20 2013 012 247 U1 describes a wind direction measuring device. The wind direction measuring devices are, for example, also applicable to combined wind direction and speed measuring devices (anemometers).

Cranes and other machines with booms are sensitive to wind. In strong winds, a boom must be retracted and/or secured. Therefore, an anemometer is mounted at the highest point of these machines to measure wind speed. This warns, for example, a crane operator when the wind is too strong for his machine, allowing him to take appropriate action. Often, there is not enough space for both a beacon and an anemometer.

SUMMARY

An object of the disclosure is to avoid the disadvantages of the prior art and to create an anemometer in which the functionality is optimized and improved, particularly for tall objects.

This object is achieved in an anemometer for measuring wind speeds including:
a) a housing and/or frame,
b) a shaft rotatably mounted in a bearing of the housing and/or frame, c) wind capturing means arranged on the shaft, wherein the wind capturing means rotate the shaft in response to wind, d) detection means for detecting the rotation speed of the shaft, and e) output means for outputting the detected rotation speed.

f) The housing and/or the frame have an electrical illuminating means as a signal light, wherein, for operation, the illuminating means is supplied with voltage from a voltage source.

Anemometers are regularly located at the highest point of an object, such as a tall building or a crane. Both the anemometer and the beacon are positioned there, which alerts third parties like airplanes to the presence of the object. The invention is based on the principle of combining these two devices. This not only saves space at the highest point of the object but also effectively combines two functions. Additionally, this arrangement allows the wind to flow freely to the anemometer while ensuring that the light from the beacon is not obstructed by the anemometer. The emitted light can thus radiate freely in all desired directions.

In an advantageous embodiment of the anemometer according to the invention, the anemometer is designed as a cup anemometer, wherein the wind capturing means are formed as hemisphere-like cups. A cup anemometer has a particularly simple mechanical construction, is robust and is not very susceptible to faults. Therefore, the invention can be well realized with such anemometers.

An advantageous alternative to the cup anemometer is to have the anemometer designed as a wind vane anemometer, wherein the wind capturing means are formed as vanes- or turbine-like vanes. In certain applications, it may be advisable not to use a cup anemometer. In such cases, the wind vane anemometer may be the better choice. While the wind rotor/wheel of the cup anemometer is exposed to unintended environmental factors such as hail or snow, a wind vane anemometer can be better protected against such environmental influences. This could potentially prevent damage to the wind rotor/wheel.

Another advantageous embodiment of the anemometer according to the invention is that the illuminating means is designed as an LED. An LED consumes relatively little energy. Nevertheless, a high luminosity with high efficiency and long lifetime is achieved with this illuminating means.

In a further preferred embodiment of the anemometer according to the invention, the illuminating means is designed to illuminate in multiple colors. This allows the beacon to be used to emit different signals. For example, it is possible to distinguish between port and starboard on a ship when such anemometers are mounted on the corresponding sides of the ship.

Preferably, electronic control means are provided in the anemometer according to the invention, which control the illumination duration and the color of the illuminating means. This has the effect that, on the one hand, the color of the illuminating means can be selected and, on the other hand, the illumination duration can be determined. This enables, for instance, signaling in a specific color, such as red or green, through blinking. But also, a bright white flashing light can be generated in principle.

A further advantageous embodiment of the invention is that at least two illuminating means are provided which are controlled simultaneously or alternately. Through this feature, the emitted light intensity can be easily varied. When both illuminating means are illuminated simultaneously, the intensity is increased. Accordingly, the intensity and also the energy consumption are reduced when only one of the two illuminating means is activated. In an advantageous aspect, if both illuminating means are simultaneously activated at reduced power, the lifetime of the illuminating means can be extended. Even the failure of one of the two illuminating means still allows for the sufficient functioning of the beacon. Two or more groups of illuminating means can also be provided, each of which individually enables a 360° illumination of the beacon.

A particular embodiment of the anemometer according to the invention is that the voltage source comprises an accumulator. This feature serves to operate the illuminating means autonomously, i.e., at least temporarily, and independently of a fixed line voltage supply or a voltage generator.

In a preferred embodiment of the anemometer according to the invention, the voltage source comprises a solar module for voltage generation. The solar module can generate electrical energy. This energy can either be passed directly to the illuminating means as a consumer or stored in an accumulator so that it can be used at another time. For example, during the day the solar module can generate electrical energy which is stored in the accumulator, and at night this stored energy can be consumed by the illuminating means.

A further advantageous embodiment of the anemometer according to the invention is achieved by providing mounting means for attachment to an object.

A preferred embodiment of the anemometer according to the invention is that a pivoting device with a horizontal pivot axis is provided, around which the anemometer is pivotably mounted, wherein a pendulum weight is provided as a balancing- or counterweight. This feature allows the wind capturing means of the anemometer to always be horizontally aligned. Even if the object to which the anemometer is attached moves, the axis of rotation remains vertical. In addition, the vertical radiation characteristic of the light or obstruction beacon are also maintained independently of the inclination angle. The pendulum should be designed—particularly with regard to flow resistance and weight—in such a way that the anemometer does not tilt even in windy conditions.

In another advantageous embodiment of the inventive anemometer, a twilight and/or proximity sensor is provided for actuating the illuminating means. This ensures that the illuminating means only switches on when it becomes dark and/or when another object approaches. This saves energy, which is particularly required for self-sufficient anemometers that draw their energy, for example, from an accumulator or solar module.

Further embodiments and advantages arise from the subject matter of the dependent claims as well as the drawings and their accompanying descriptions. Exemplary embodiments are explained in more detail below with reference to the attached drawings. The invention should not be limited solely to the listed exemplary embodiments. They serve merely to provide a closer explanation of the invention. The present invention is intended to encompass all objects that a skilled person would consider obvious for realizing the invention, both now and in the future.

DETAILED DESCRIPTION

Figure 1:
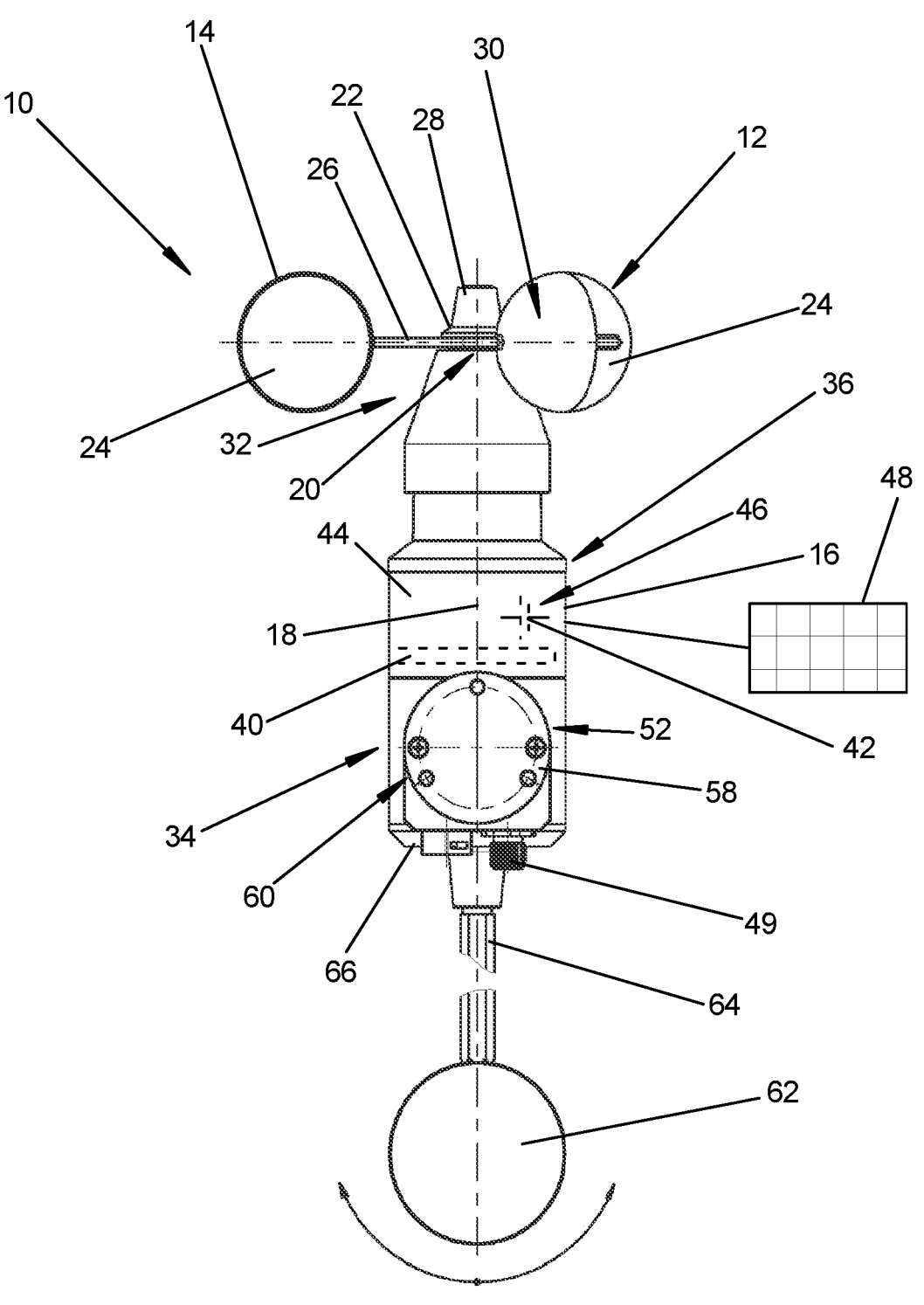
FIG. 1 shows a schematic rear view of an exemplary embodiment of an anemometer with beacon.

FIG. 1 shows a schematic rear view of an anemometer 10. The anemometer 10 is designed as a cup anemometer and has a wind capturing means 14 designed as a wind rotor/wheel 12 and a housing 16. In a plane of rotation 17 and a vertically oriented axis of rotation 18, the wind rotor/wheel 12 is fixedly mounted on a shaft 20 using fastening means 22. In the present embodiment, the wind rotor/wheel 12 comprises three hemisphere-like cups 24, which are connected to the shaft 20 via spokes 26 through a hub 28. The shaft 20 is rotatably mounted within the housing 16. Open sides 30 of the three hemisphere-like cups 24 face the same direction on the rotation plane.

The housing 16 can be divided into three housing sections 32, 34, 36. The uppermost section 32 comprises the wind capturing means 14. The lowermost section 34 forms a central main body 38, within which electronics 40, accumulators 42, and mechanical components, particularly detection means 43 for capturing the rotation speed ω of the shaft 20, are provided. In the middle section 36, an illuminating means 44 is provided which receives its voltage from a voltage source 46, such as the accumulator 42 in the housing 16. This illuminating means 44, also referred to as a beacon or signaling device, is controlled as required by the electronics 40 to act as a signal light. A twilight sensor 47 activates the illuminating means 44 as soon as it becomes dark in order to develop its signaling and warning effect for the object in question. The electronics are processor-controlled for this purpose and also receive their electrical voltage from the voltage source 46. To generate blinking or other signals dependent on signal duration, the electronic control means 40 can accordingly switch the illuminating means 44.

The illuminating means 44 comprises LEDs. Different signals can be generated with different colors of the illuminating means 44. The illuminating means 44 is controlled in a suitable manner by the electronic control means 40 depending on the application. The signals and data acquired by the anemometer 10 during wind measurement are transmitted via the interface 49. In addition, the electronic control means 40 can be controlled or programmed externally via the interface 49.

The pivoting device 50 is mounted on the central main body 38. The central main body 38 is pivotally supported by the cylindrical body 52 of the pivoting device 50. The cylindrical body 38 is attached to an object not shown by the attachment flange 58. In this regard, the mounting means 60 comprises the attachment flange 58, whereby the anemometer 10 is attached to the object.

The pendulum weight 62 acts as a counterweight to prevent the anemometer 10 from swinging sideways about the pivot axis 61 when wind occurs. For this purpose, the pendulum weight 62 is firmly and rigidly bolted to the rod 64 at the bottom 66 of the housing 16. The pendulum weight 62 helps maintain the vertical orientation of the rotational axis 18 of the anemometer 10. As a result, the wind rotor/wheel 12 remains in its horizontal position.

Figures 2, 3:
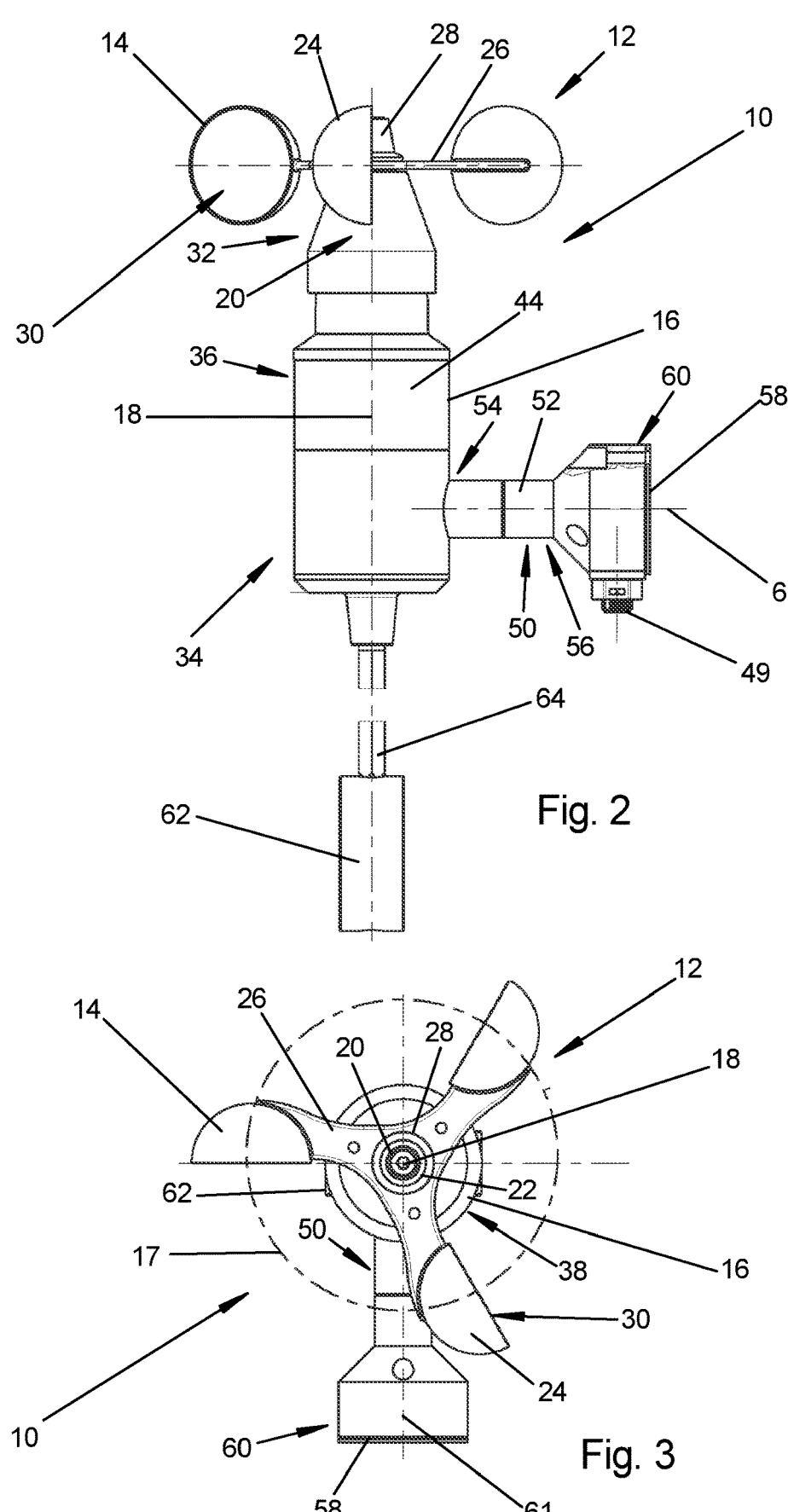
FIG. 2 shows a schematic side view of the anemometer with beacon according to FIG. 1.
FIG. 3 shows a schematic sketch of the anemometer with beacon according to FIGS. 1 and 2 in a top view.

FIG. 3 shows a schematic sketch of the anemometer 10 with beacon 44 according to FIGS. 1 and 2 in a top view. Insofar as the figures correspond, the same reference signs are therefore also used.

The wind rotor/wheel 12 is mounted on the shaft 20 in the plane of rotation 17 and the axis of rotation 18 of the cup anemometer 10, which is perpendicular to it. When the wind rotor/wheel 12 rotates, the shaft 20 is carried along in the rotational motion. The wind rotor/wheel 12 consists of three hemisphere-like cups 24, which are rigidly connected to the shaft 20 through spokes 26 via the hub 28, ensuring their rotation.

The pivoting device 50 is secured to an object using the mounting means 60. The central main body 38 of the anemometer 10 is pivotably mounted on the pivoting device 50. The mounting means 60, including the attachment flange 58, are rigidly and immovably connected to the object. The housing 16 of the anemometer 10 can thus be pivoted accordingly.

The pendulum weight 62 prevents the anemometer from tilting sideways about the pivot axis 61 when wind occurs. For this reason, the pendulum weight 62 is firmly and rigidly bolted to the rod 64 at the bottom 66 of the housing 16. The pendulum weight 62 keeps the axis of rotation 18 of the anemometer 10 largely stable in the vertical. The wind rotor/wheel 12 itself thus remains in its horizontal position.

Figures 4A, 4B, 4C:
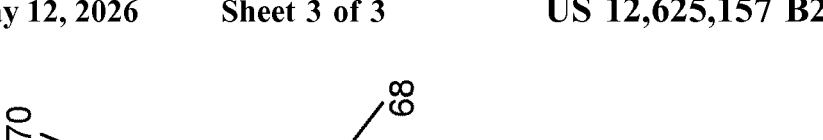
FIG. 4*a* shows a schematic sketch of the beacon of the anemometer according to the invention with two spatially alternating illuminating means groups with illuminating means in normal operation.
FIG. 4*b* shows, according to FIG. 4*a*, two spatially alternating groups of illuminating means, with only the first group is activated.
FIG. 4*c* shows, according to FIG. 4*a* or 4*b*, two spatially alternating groups of illuminating means, with only the second group is activated.

FIG. 4*a* illustrates in a schematic principle sketch of an embodiment of the beacon 44 for the anemometer 10 according to the invention. The beacon 44 comprises two exemplary illuminating means groups 68, 70, which consist of LEDs. The LED light groups 68, 70 are arranged spatially alternately around an LED holder 72 which is hexagonal in section. Both LED light groups 68, 70 are illuminated in this figure, which is indicated by their hatching. With this simultaneous activation of the illuminating means groups 68, 70, the maximum light intensity of the beacon 44 can be achieved if required. In normal operation, however, half the power is sufficient, which conserves LEDs and accumulator 42.

FIG. 4*b*, as per FIG. 4*a*, illustrates the two alternating illuminating means groups 68, 70 arranged around the hexagonal LED holder 72, where only the LEDs of the first illuminating means group 68 are illuminated. The illumination of the first LED light group 68 is again indicated by the hatching. The LEDs of the second illuminating means group 70 are switched off and therefore shown without hatching.

FIG. 4*c*, in accordance with FIG. 4*a* or 4*b*, illustrates the two spatially alternating illuminating means groups 68, 70, where only the second illuminating means group 70 is illuminated. Again, the illuminated illuminating means group 70 is indicated by hatching. FIGS. 4*b* and 4*c* show on the one hand an energy-saving variant, since in each case only one of the illuminating means groups 68 or 70 is activated. On the other hand, a backup operation can be realized in case one of the light groups 68 or 70 fails.

LIST OF REFERENCE SIGNS 10 anemometer
12 wind rotor/wheel
14 wind capturing means
16 housing
17 plane of rotation
18 axis of rotation
20 shaft 22 fastening means
24 hemisphere-like cups
26 spokes
28 hub
30 open sides
32 uppermost section
34 lowermost section
36 middle section
38 central main body
40 electronics
42 accumulator
43 detection means
44 illuminating means
46 voltage source
47 twilight sensor
48 solar module
49 interface
50 pivoting device
52 cylindrical body
54 first end
56 second end
58 attachment flange
60 mounting means
61 pivot axis
62 pendulum weight
64 rod
66 bottom
68 first LED light group
70 second LED light group
72 hexagonal LED mount

The invention claimed is:

1. An anemometer (10) for measuring wind speeds comprising:

a housing (16) and/or frame, a shaft (20) rotatably mounted in a bearing of the housing (16) and/or frame, wind capturing means (14) arranged on the shaft (20), wherein the wind capturing means (14) rotate the shaft (20) in response to wind, detection means (43) for detecting a rotation speed (ω) of the shaft (20), output means (49) for outputting the detected rotation speed (ω), a mount (60) for attaching the anemometer (10) to an object, a pivoting device (50) around which the anemometer (10) is pivotably mounted, the pivoting device (50) extending along a horizontal pivot axis (61) between the housing (16) and/or frame and the mount (60); and a pendulum weight (62) connected to a bottom (66) of the housing (16) and/or frame, the pendulum weight (62) acting a counterweight to prevent the anemometer from swinging sideways about the pivot axis (61), wherein the housing (16) and/or the frame have an electrical illuminating means (44) as a signal light, and wherein, for operation, the illuminating means (40) is supplied with voltage from a voltage source (46).

2. The anemometer (10) for measuring wind speeds according to claim 1, wherein the anemometer (10) is designed as a cup anemometer, wherein the wind capturing means (12) are formed as hemisphere-like cups (18).

3. The anemometer (10) for measuring wind speeds according to claim 1, wherein the anemometer (10) is designed as a vane anemometer, wherein the wind capturing means (12) are formed as vanes- or turbine-like vanes.

4. The anemometer (10) for measuring wind speeds according to claim 1, wherein the illuminating means (40) is designed as an LED.

5. The anemometer (10) for measuring wind speeds according to claim 1, wherein the illuminating means (44) is designed to illuminate in multiple colors.

6. The anemometer (10) for measuring wind speeds according to claim 1, wherein electronic control means (40) are provided to control an illumination duration and color of the illuminating means.

7. The anemometer (10) for measuring wind speeds according to claim 1, wherein at least two illuminating means are provided which are controlled simultaneously or alternately.

8. The anemometer (10) for measuring wind speeds according to claim 1, wherein the voltage source (46) comprises an accumulator (42).

9. The anemometer (10) for measuring wind speeds according to claim 1, wherein the voltage source (46) comprises a solar module (48) for voltage generation.

10. The anemometer (10) for measuring wind speeds according to claim 1, wherein a twilight and/or proximity sensor for actuating the illuminating means.

11. An anemometer (10) for measuring wind speeds, comprising:

a housing (16) and/or a frame, a shaft (20) rotatably mounted in a bearing of the housing (16) and/or the frame, a wind rotor (14) arranged on the shaft (20), wherein the wind rotor (14) rotates the shaft (20) in response to wind, a detector (43) for detecting a rotation speed (ω) of the shaft (20), an output (49) for outputting the detected rotation speed (ω), a signal light arranged in the housing (16) and/or on the frame, a voltage source (46) that supplies a voltage to the signal light, a mount (60) for attaching the anemometer (10) to an object, a pivoting device (50) around which the anemometer (10) is pivotably mounted, the pivoting device (50) extending along a horizontal pivot axis (61) between the housing (16) and/or frame and the mount (60); and a pendulum weight (62) connected at a bottom (66) of the housing (16) and/or frame, the pendulum weight (62) acting a counterweight to prevent the anemometer from swinging sideways about the pivot axis (61).

12. The anemometer (10) for measuring wind speeds according to claim 1, wherein the pendulum weight (62) is arranged below the bottom (66) of the housing (16) and/or frame and connected thereto by a rod (64).

13. The anemometer (10) for measuring wind speeds according to claim 1, wherein the voltage source (46) is an accumulator (42) arranged in the housing (16) and/or frame, and wherein the anemometer (10) includes a twilight sensor (47) configure to activate the illuminating means (40) upon darkness.

14. The anemometer (10) for measuring wind speeds according to claim 1, wherein the pivoting device (50) is mounted to a central main body (38) of the housing (16) and/or frame substantially centrally between the wind capturing means (14) and the pendulum weight (62).

15. The anemometer (10) for measuring wind speeds according to claim 1, wherein the wind capturing means (14) include a wind rotor (12), wherein the mount (60) include an attachment flange (58) configured to be rigidly and immovably connected to an object, wherein the anemometer (10) can pivot about the horizontal pivot axis (61) relative to the object, and wherein the pendulum weight (62) causes the wind rotor to remain in a substantially horizontal orientation.

\* \* \* \* \*